United States Patent
Androski et al.

(10) Patent No.: US 7,630,372 B1
(45) Date of Patent: Dec. 8, 2009

(54) METHOD AND APPARATUS FOR PROVIDING ACCESS AND EGRESS UNIFORM RESOURCE IDENTIFIERS FOR ROUTING

(75) Inventors: Frank J. Androski, Freehold, NJ (US); Saul Fishman, Highland Park, NJ (US); James Ibezim, Wayside, NJ (US); Barbara J. Kittredge, Brunswick, ME (US); James J. Mansell, Fair Haven, NJ (US)

(73) Assignee: AT&T Corp., New York, NY (US)

( * ) Notice: Subject to any disclaimer, the term of this patent is extended or adjusted under 35 U.S.C. 154(b) by 324 days.

(21) Appl. No.: 11/322,925

(22) Filed: Dec. 30, 2005

(51) Int. Cl.
*H04L 12/28* (2006.01)
(52) U.S. Cl. .................. 370/392; 370/349; 370/352
(58) Field of Classification Search ............ 379/351, 379/354, 912; 370/230, 392, 352, 356, 349
See application file for complete search history.

(56) References Cited

U.S. PATENT DOCUMENTS

| | | | |
|---|---|---|---|
| 6,678,264 B1 * | 1/2004 | Gibson | 370/352 |
| 7,283,516 B1 * | 10/2007 | Ganesan et al. | 370/352 |
| 7,330,470 B2 * | 2/2008 | Nakazawa et al. | 370/392 |
| 7,369,493 B2 * | 5/2008 | Ibezim et al. | 370/230 |
| 7,535,905 B2 * | 5/2009 | Narayanan et al. | 370/392 |
| 2001/0037401 A1 * | 11/2001 | Soumiya et al. | 709/232 |
| 2002/0027915 A1 * | 3/2002 | Foti et al. | 370/392 |
| 2003/0179762 A1 * | 9/2003 | Isomaki et al. | 370/401 |
| 2003/0200260 A1 * | 10/2003 | Donovan et al. | 709/203 |
| 2004/0028080 A1 * | 2/2004 | Samarasinghe et al. | 370/486 |
| 2004/0095938 A1 * | 5/2004 | Ryu | 370/392 |
| 2004/0107238 A1 * | 6/2004 | Orton et al. | 709/200 |
| 2005/0002381 A1 * | 1/2005 | Westman et al. | 370/352 |
| 2005/0073997 A1 * | 4/2005 | Riley et al. | 370/352 |
| 2005/0232225 A1 * | 10/2005 | Pelaez et al. | 370/351 |
| 2006/0239257 A1 * | 10/2006 | Banner et al. | 370/356 |
| 2006/0250989 A1 * | 11/2006 | Wengrovitz | 370/260 |
| 2007/0091879 A1 * | 4/2007 | Croak et al. | 370/356 |
| 2007/0121603 A1 * | 5/2007 | Clark et al. | 370/356 |
| 2008/0247384 A1 * | 10/2008 | Arauz-Rosado et al. | 370/352 |

* cited by examiner

*Primary Examiner*—Olisa Anwah

(57) ABSTRACT

A method and apparatus for providing routing of calls in a packet network, e.g., a Voice over Internet Protocol (IP) network, using one or more criteria extracted from signaling information to determine the routing for the calls are disclosed. In one embodiment, the routing criteria extracted from signaling messages comprises at least one of: an access Uniform Resource Identifier, a destination phone number, a destination URI host, a calling party number, a calling party URI host, an incoming IP address, or a requested codec. An access URI and the egress URI are used to enhance routing decisions in a VoIP network. For instance, the egress URI can be used to specify egress route selections from the egress point of a VoIP network. The access URI can be used to influence the routing decisions within the VoIP network as well as the routing decisions with regard to egress routes from the egress point of the VoIP network.

5 Claims, 6 Drawing Sheets

400

| Originating BE | Access ID | Destination Phone Number | Route List | Comments |
|---|---|---|---|---|
| BE 312 | Access Point 321/Link 381 | Endpoint 354 NPA-NXX | R1 | NPA-NXX of endpoint 354 uses route list R1 |
| BE 312 | Access Point 321/Link 382 | Endpoint 355 NPA-NXX | R2 | NPA-NXX of endpoint 355 uses route list R2 |
| BE 312 | Access Point 321/Link 383 | Endpoint 356 NPA-NXX | R3 | NPA-NXX of endpoint 356 uses route list R3 |

401, 402, 403

410

| Route List | Seq or Pct | Egress BE | Egress ID | Comments |
|---|---|---|---|---|
| R1 | 1st | 313 | Egress Point 331/Link 371 and Egress Point 332/Link 372 | First of 2 egress routes to use in R1 route list |
| R1 | 2nd | 314 | Egress Point 341/Link 374 | Second of 2 egress routes to use in R1 route list |
| R2 | 50% | 313 | Egress Point 333/Link 373 | Load balancing 50% calls to use this exit route |
| R2 | 50% | 314 | Egress Point 342/Link 375 | Load balancing the remaining 50% calls to use this exit route |
| R3 | 1st | 314 | Egress Point 341/Link 374 | |

METHOD AND APPARATUS FOR PROVIDING ACCESS AND EGRESS UNIFORM RESOURCE IDENTIFIERS FOR ROUTING

The present invention relates generally to communication networks and, more particularly, to a method and apparatus for providing access and egress Uniform Resource Identifiers for routing in packet networks, e.g., Voice over Internet Protocol (VoIP) or Services over Internet Protocol (SoIP) networks.

BACKGROUND OF THE INVENTION

When a call setup message is received by a VoIP network, the network performs routing decision using the destination phone number and other criteria such as calling phone number, access point, source host/IP address, carrier, codec preferences, and number portability. The destination phone number and other criteria are used to map into a destination IP address and IP routing is performed based on this destination IP address. Call media related packets are routed from an access point of the VoIP network to an egress point of the VoIP network using the destination IP address. However, by only using the destination IP address for routing, the network is not able to specify more general routing decisions such as selecting one of multiple exit routes from the egress point of the VoIP network, if multiple exit routes are available at the egress point. Similarly, the network is not able to take into considerations access arrangements at the access point of the VoIP network of an incoming call to specify more general routing decisions that cannot be made using the calling party phone number or the source IP address of the call.

Therefore, a need exists for a method and apparatus for providing access and egress Uniform Resource Identifiers (URI) for routing in a packet network, e.g., a VoIP network.

SUMMARY OF THE INVENTION

In one embodiment, the present invention enables routing of calls in a packet network, e.g., a Voice over Internet Protocol (IP) network using one or more criteria extracted from signaling information to determine the routing for the call. In the present invention, the routing criteria extracted from signaling messages comprises at least one of: an access Uniform Resource Identifier (URI), a destination phone number (e.g., from the Request URI), a destination URI host, a calling party number (e.g., from the From URI, P-Asserted Identity URI, or Diversion Header), a calling party URI host, an incoming IP address (e.g., from the top Via header), a requested codec, or other criteria extracted from the incoming signaling message (e.g. a SIP INVITE request URI, codec preferences from a Session Description Protocol header). The access URI and the egress URI enhance routing decisions in a VoIP network. For instance, the egress URI can be used to specify egress route selections from the egress point of a VoIP network. The access URI can be used to influence the routing decisions within the VoIP network as well as the routing decisions with regard to egress routes from the egress point of the VoIP network.

BRIEF DESCRIPTION OF THE DRAWINGS

The teaching of the present invention can be readily understood by considering the following detailed description in conjunction with the accompanying drawings, in which:

FIG. 4 illustrates a set of exemplary routing tables used to determine routing between access points and egress points in a VoIP network of the present invention;

To facilitate understanding, identical reference numerals have been used, where possible, to designate identical elements that are common to the figures.

DETAILED DESCRIPTION

Figure 1:
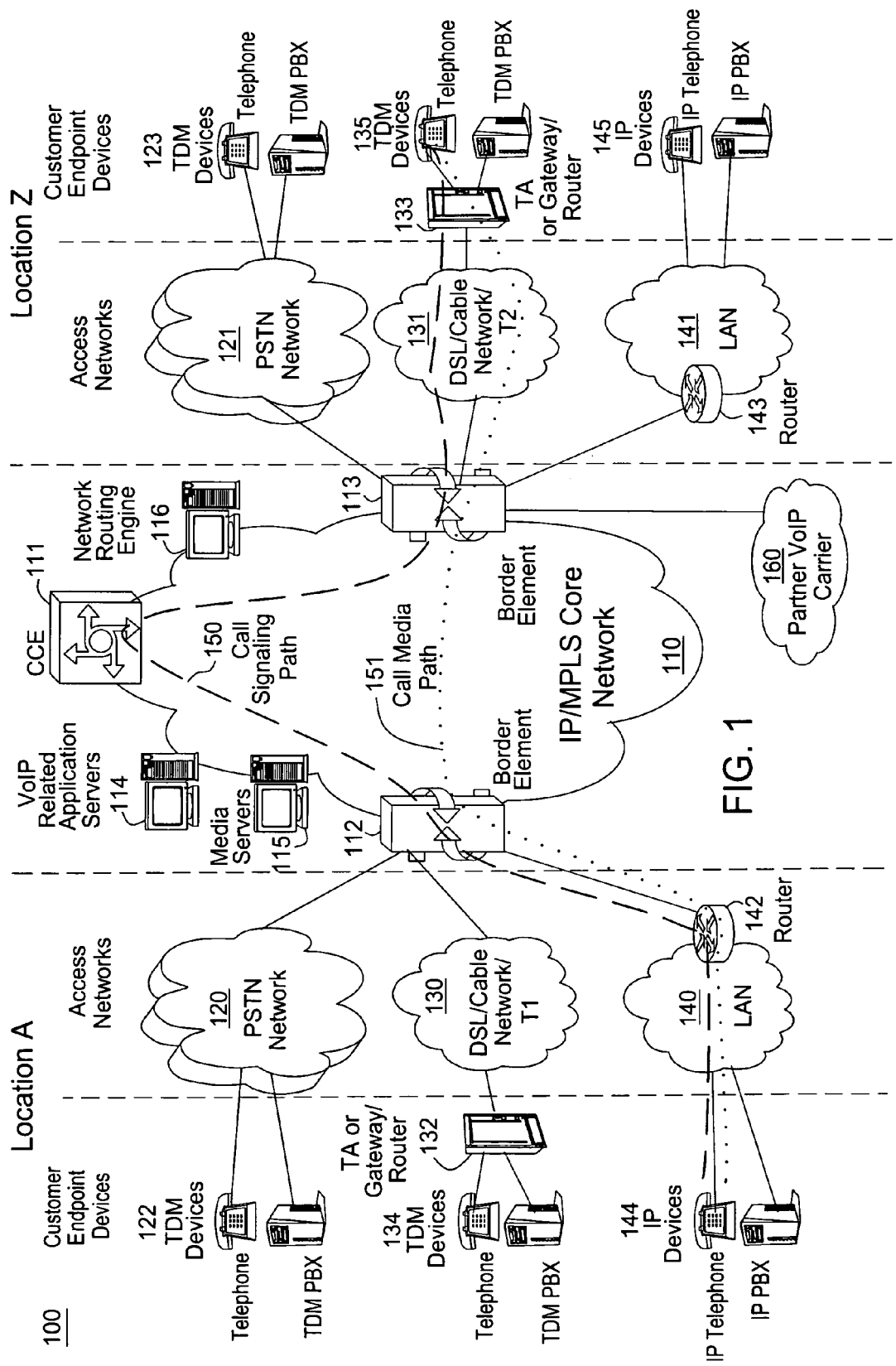
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchanges (PBXs). IP based customer endpoint devices 144 and 145 typically comprise IP phones or IP PBX. The Terminal Adaptors (TA) or Gateway/Routers 132 and 133 are used to provide necessary interworking functions between TDM customer endpoint devices, such as analog phones, and packet based access network technologies, such as Digital Subscriber Loop (DSL), Cable broadband access, to Digital Private Line (e.g. T1) networks. TDM based customer endpoint devices access VoIP services by using either a Public Switched Telephone Network (PSTN) 120, 121 or a broadband access network via a TA or Gateway/Router 132 or 133. IP based customer endpoint devices access VoIP services by using a Local Area Network (LAN) 140 and 141 with a router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a router 142. A packet based access network 130 or 131, such as DSL or Cable, when used together with a TA or Gateway/Router 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. If connecting to a TDM network, the BE is typically implemented as a Media Gateway and performs signaling, media control, security, and call admission control and related functions. If connecting to a packet network, the BE is typically a Session Border Controller which provides firewall, Network Address Translation (NAT), signaling, media control, security, and call admission control functions The CCE resides within the VoIP infrastructure and is connected to the BEs using the Session Initiation Protocol (SIP) over the underlying IP/MPLS based core backbone network 110. The CCE is typically implemented as a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that requires certain service specific features, e.g. translation of an E.164 Toll-Free telephone number to a routing number. In order to determine the routing of a call, such as determining the egress BE to be used for a call, the CCE 111 needs to interact with Network Routing Engine (NRE) 116 to obtain the routing decision of a call. Namely, the CCE is back to back user agent, and the NRE is a Redirect Server. The NRE function can be implemented on the same platform as the CCE or on a separate physical platform. In addition, the relationship of CCEs to NREs can be an m-to-n. For instance, there maybe m CCEs and n NREs in a VoIP network, where m typically is larger than n.

For calls that originate or terminate to a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is set up between two customer endpoints. A customer using IP device 144 at location A places a call to another customer at location Z using TDM device 135. During the call setup, a setup signaling message is sent from IP device 144, through the LAN 140, the router 142, and the associated packet based access network, to BE 112. BE 112 will then send a setup signaling message, such as a SIP-INVITE message if SIP is used, to CCE 111. CCE 111 looks at the called party and other information and queries the necessary VoIP service related application server 114 to obtain the information to complete this call. In one embodiment, the application server functions as a SIP back-to-back user agent, a proxy or a redirect server. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 response message if SIP is used, is sent in the reverse direction back to the CCE 111. After the CCE 111 receives the call acknowledgement message, it will then send a call acknowledgement signaling message, such as a SIP 200 response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been set up between two endpoints, the CCE 111 does not need to be in the media path.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

When a call setup message is received by a packet network, e.g., a VoIP network, the network performs routing decision using the destination phone number and other criteria. The destination phone number is used to map into a destination BE IP address and IP routing is performed based on this destination IP address. Call media related packets are routed from an access point of the VoIP network to an egress point of the VoIP network using the destination IP address. However, by only using the destination IP address for routing, the network is not able to specify more general routing decisions such as selecting one of multiple exit routes from the egress BE of the VoIP network, if multiple exit routes are available at the egress BE. Similarly, the network is not able to take into consideration the access arrangement at the access BE of the VoIP network of an incoming call to specify more general routing decisions that cannot be made using the calling party phone number or the source IP address of the call.

To address this criticality, the present invention enables routing of calls in a packet network, e.g., a Voice over Internet Protocol (IP) network using one or more criteria extracted from signaling information to determine the routing for the call. In one embodiment of the present invention, the routing criteria extracted from signaling messages comprises at least one of: an access Uniform Resource Identifier (URI), a destination phone number, a destination URI host, a calling party number, a calling party URI host, a top Via Header IP address, a requested codec, or other criteria extracted from the incoming signaling message (e.g. a SIP INVITE request URI, codec preferences from a Session Description Protocol header). The access URI and the egress URI enhance routing decisions in a VoIP network. For instance, the egress URI can be used to specify egress route selections from the egress point of a VoIP network. The access URI can be used to influence the routing decisions within the VoIP network, such as the use of application servers, as well as the routing decisions of egress routes from the egress point of the VoIP network.

In one embodiment, the route list resulting from a routing decision may be ordered using a number of methods, such as sequential or proportional methods. Each entry in a route list specifies the IP address of an egress Border Element (BE) and an egress route from the Border Element. The egress route may be a TDM trunk group to a switched telephone network, the identity of a Session Initiation Protocol (SIP) or H.323 gateway to which the call is to be routed, or a SIP or H.323 terminal to which the call is to be terminated, or other types of terminals and gateways.

In one embodiment, the access URI (e.g., access identification (ID) parameter) is inserted in a call setup message header by the access BE. The modified call setup message is then forwarded to a Call Control Element (CCE). The CCE interacts with the Network Routing Engine (NRE) to obtain the egress routing decision and inserts one or more egress URIs (e.g., egress identification (ID) parameter) in the call setup message header. The egress URIs are sent in the call setup message to the egress BE and used by the egress BE to select one or more specific egress routes for the call.

Figure 2:
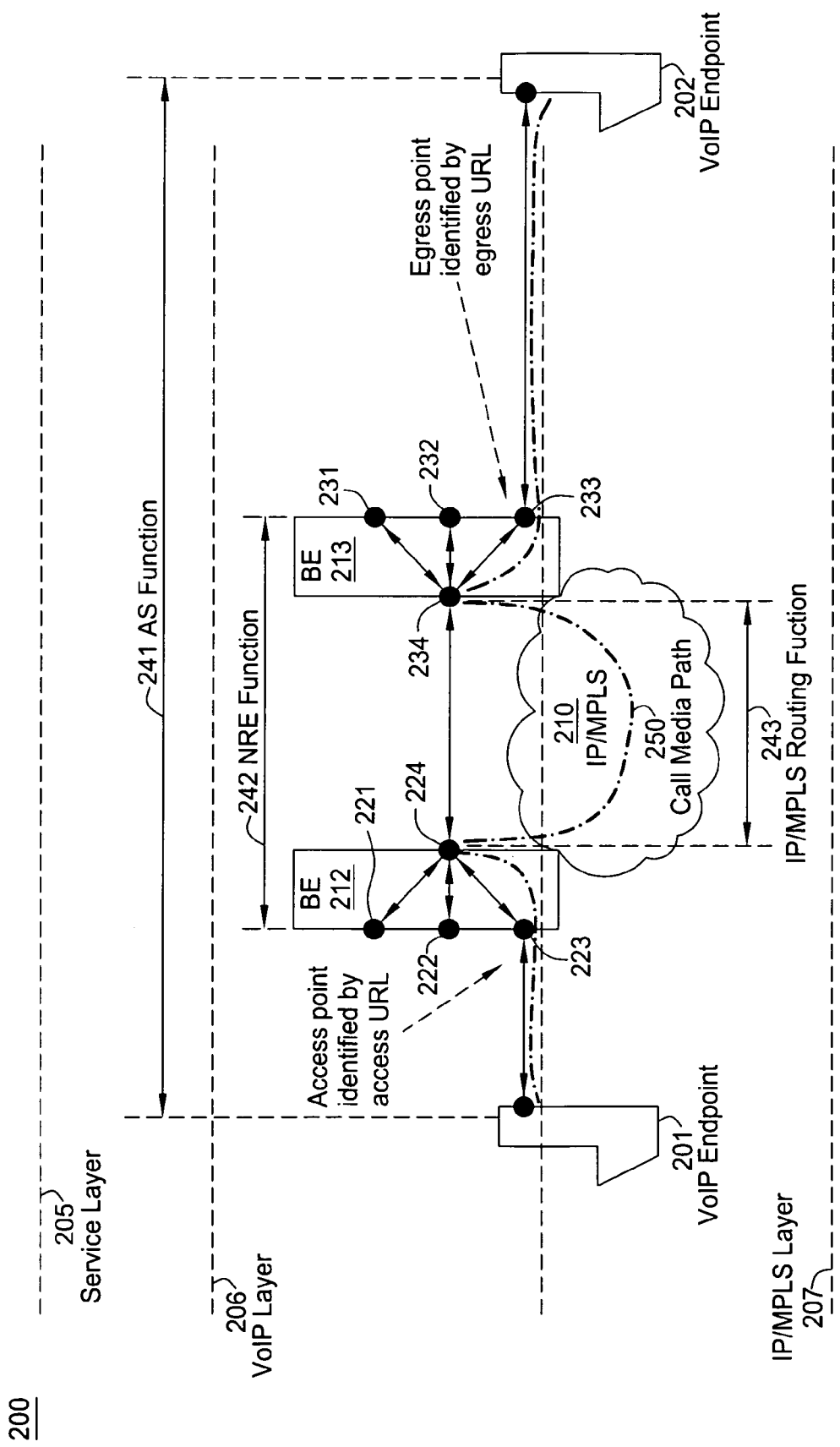
FIG. 2 illustrates an example of the relationships of access points and egress points in a packet network, e.g., a VoIP network of the present invention.

FIG. 2 illustrates an example 200 of the relationships of access points and egress points in a packet network, e.g., a VoIP network of the present invention. In FIG. 2, the overall VoIP network can be viewed as three logical layers: a service layer 205, a VoIP layer 206, and an IP/MPLS layer 207.

The service layer is responsible for Application Server function 241 that identifies the customer for the call and determines the destination to which the customer would like to send the call (e.g. a terminating PBX). The AS function 241 also verifies the calling party and/or the called party subscription information, such as service features subscribed. The scope of the AS function 241 is between VoIP endpoints, such as VoIP endpoint 201 and 202.

The IP/MPLS layer is responsible for IP/MPLS routing function 243 that performs IP routing for the IP/MPLS layer and routes packets across the IP/MPLS network. The scope of the IP/MPLS routing function is between the network side BE egress points, such as egress point 224 and 234.

The VoIP layer is responsible for call processing functions that include Network Routing Engine (NRE) function 242 that provides routing for the VoIP layer to determine the egress Border Element and the egress route beyond the Border Element to be used to reach the called party endpoint. The routing decision identified by the NRE function specifies the network-side IP address of the egress BE, and the egress route beyond the Border Element. The scope of the VoIP layer function 242 is between BEs, such as BE 212 and BE 213 shown in FIG. 2.

In one embodiment of the present invention, the scope of the VoIP layer function 242 is between an access point of a BE to an egress point of a BE, such as access point 223 on BE 212 to egress point 233 on BE 213. For instance, VoIP endpoint 201 makes a call to VoIP endpoint 202. The call traverses the access side access point 223 on BE 212 to the network side access point 224 and then over the IP/MPLS network 210 to reach the network side egress point 234 on BE 213 to get to the egress side egress point 233. When the call is set up by a CCE using the routing decision determined by the NRE function. The NRE function 242 determines that the routing of the call originated from the access side access point 223 has to be routed through the network side access point 224 on BE 212 to egress BE 213 using the network side egress point 234 to exit to the egress side egress point 233. Thus, a call media path 250 can be established between BE 212 and BE 213.

The present invention enables the network, e.g., the NRE in particular, to use an access URI, that specifies an access side access point, and an egress URI, that specifies an egress side egress point, to make and specify routing decisions.

Figure 3:
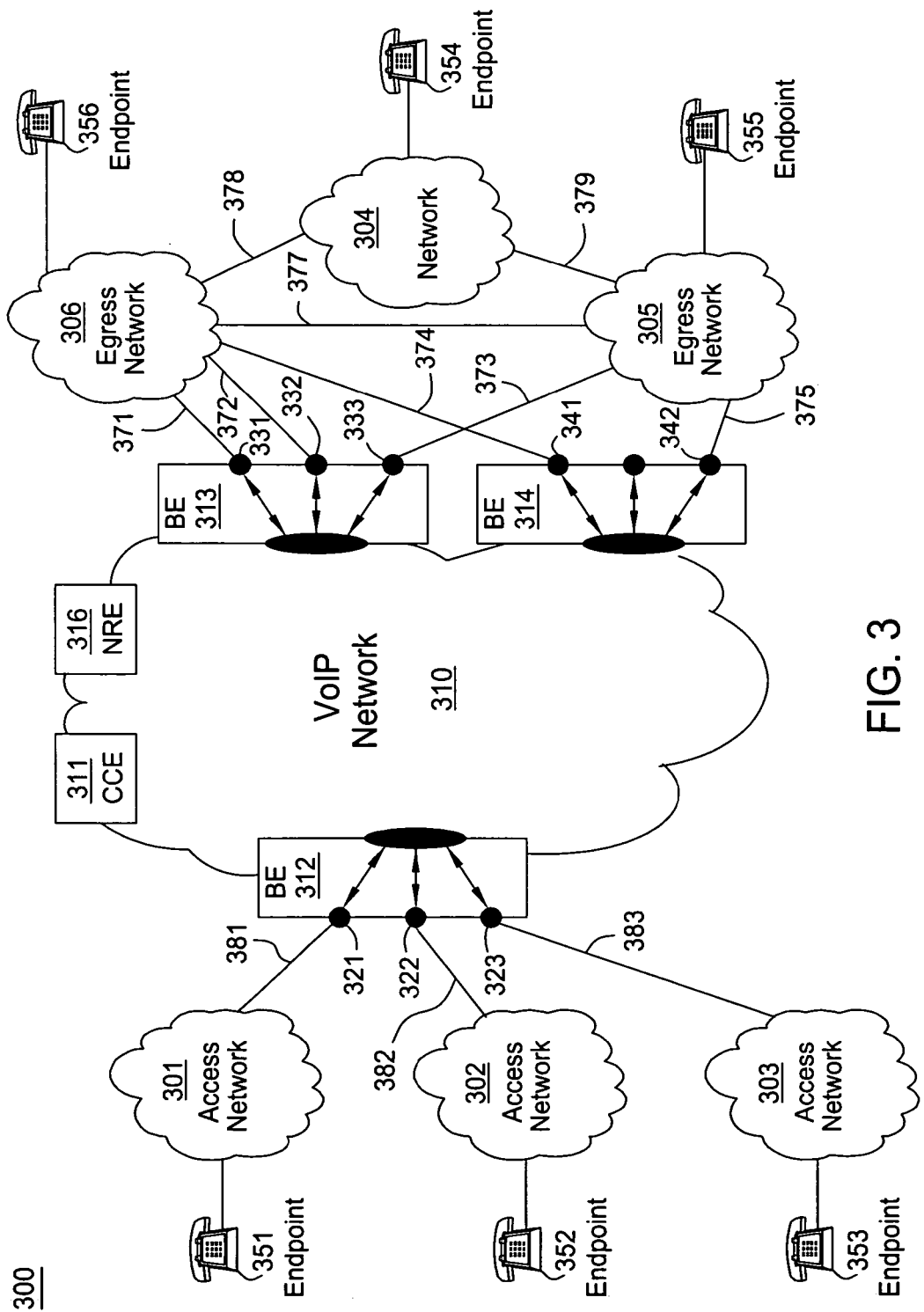
FIG. 3 illustrates an example of the use of access URI and egress URI in a packet network, e.g., a VoIP network of the present invention.

FIG. 3 illustrates an example 300 of the use of access URI and egress URI in a packet network, e.g., a VoIP network of the present invention. In FIG. 3, CCE 311 is responsible for call processing related functions and NRE 316 is responsible for routing decision functions between access points to egress points of VoIP network 310. NRE 316 uses tables as shown in FIG. 4 to perform routing decisions.

FIG. 4 illustrates a set of exemplary routing tables used to determine routing between access points and egress points in a packet network, e.g., a VoIP network of the present invention. Table 400 is a table that maps routing criteria to a route list and table 410 is a table that maps a route list into resulting egress routing information.

In table 400, routing criteria, such as access or originating BE, access identification (ID), and called party or destination phone number, are used to map into a route list to be used to determine egress routing. After a particular route list is determined, the selected route list is used as a key to map into resulting egress routing decision in table 410. In table 410, a route list entry maps into a resulting egress routing decision, such as the sequence or the percentage of usage of the selected route list as well as the egress BE and the egress ID.

Referring back to FIG. 3, endpoints 351, 352, and 353 are calling parties in one example. Endpoint 351 is connected to an access network 301, and access network 301 is connected to a VoIP network 310 via link 381 to an access point 321 on BE 312. Endpoint 352 is connected to an access network 302, and access network 302 is connected to the VoIP network 310 via link 382 to an access point 322 on BE 312. Endpoint 353 is connected to an access network 303, and access network 303 is connected to the VoIP network 310 via link 383 to an access point 323 on BE 312.

Endpoints 354, 355, 356 are called parties in this example. Endpoint 354 is connected to a network 304. Network 304 is connected to an egress network 305 and an egress network 306 via link 379 and 378 respectively. Endpoint 355 is connected to the egress network 305. Egress network 305 is connected to the VoIP network 310 via link 375 to an access point 342 on BE 314. Egress network 305 is also connected to the VoIP network 310 via link 373 to access point 333 on BE 313. Egress network 305 is also connected to network 304 and egress network 306.

Endpoint 356 is connected to the egress network 306. Egress network 306 is connected to the VoIP network 310 via link 371 to an access point 331 on BE 313. Egress network 306 is also connected to the VoIP network 310 via link 372 to an access point 332 on BE 313. Egress network 306 is also connected to VoIP network 310 via link 374 to an access point 341 on BE 314. Egress network 306 is also connected to network 304 and egress network 305.

In FIG. 3, in one embodiment of the present invention, endpoint 351 makes a call to endpoint 354. The incoming call setup message from endpoint 351 is received by BE 312 via access point 321. BE 312 then inserts the access point 321 related information as an access ID into the call setup message and forwards it to CCE 311 to be processed. Note that an access ID basically is an access URI. Then, CCE 311 interacts with NRE 316 to obtain a routing decision for the call. The access URI may contain information related to access link 381, such as the access link identification (ID), the access link type, and other pertaining parameters. The detailed definitions and formats of an access URI will be given in section URI-02200 and URI-02202 below. Upon receiving the call setup message, NRE 316 uses tables 400 and 410 to determine the routing of the call. For instance, NRE 316 may use the access ID, such as information of the access link ID and type, the access BE IP address, and the called party phone number to obtain a route list, from table 400, that is to be used to determine the routing of the call. For example, in row 401, by using IP address of access BE 312, access link 381 information, and endpoint 354 phone number as a key, NRE 316 determines that route list R1 (e.g., a routing decision) is to be used to route the call. Then, NRE 316 uses the selected route list, R1 in this example, as a key to table 410 to lookup the egress routing information, such as the egress BE IP address, the egress ID, and the egress associated action. An egress ID is simply a set of one or more egress URIs. It is sometimes beneficial to specify more than one egress URI in a consolidated fashion in a single egress ID. The egress URI may contain information related to the egress link, such as the egress link identification (ID), the egress link type, and other pertaining parameters. The detailed definitions and formats of egress URI will be given in section URI-02204, URI-02206, URI-02208, and URI-02210 below.

When a route list produces multiple egress routing choices, the egress associated action indicates the order or the percentage on how these choices are to be used. For instance, route list R1 produces two route choices in rows 411 and 412. The egress associated action or sequence or percentage column indicates that the egress routing choices shall be used in the order of row 411 followed by row 412. In other words, the egress route in row 411 shall be the first choice, and the egress route in row 412 shall be the second choice. When a call setup fails to be completed through the first choice egress route, then the second choice will be used.

In row 411, e.g., the first choice of the egress routes, route list R1 produces the IP address of BE 313 and an egress ID with 2 egress route options, the egress point 331/link 371 egress URI and the egress point 332/link 372 egress URI. Since there are two egress routes available from BE 313 to egress network 306, the two egress URIs are combined within a single consolidated egress ID. Both egress URIs can be signaled to BE 313 in the same SIP INVITE. If the first route via egress point 331/link 371 does not succeed, BE 313 can try the route via egress point 332/link 372. BE 313 does not need to crankback the call to the CCE/NRE to get the second route. The multiple egress URIs in a single egress ID can be used even when different delivered digits are needed for different egress routes. The delivered digits can be included in the userinfo portion of each of the two egress URIs. The BE uses the userinfo portion from the egress URI as the Request URI in the outgoing INVITE (or to derive the called party number if the egress signaling is H.323 or ISUP).

In row 412, e.g., the second choice of the egress routes, route list R1 produces the IP address of BE 314 and an egress URI, or egress ID, using egress point 341/link 374. The call can then be completed via egress network 306 to network 304 to endpoint 354.

In this example, access network 301, VoIP network 310, and egress network 306 have an agreement that all calls originating from access network 301, information that can be extracted using the access URI, must be completed via egress network 306. Therefore, even though BE 313 can complete the call to endpoint 354 via egress network 305, egress network 305 is not used. Similarly, even though BE 314 can complete the call to endpoint 354 via egress network 305, egress network 305 is not used. Thus, in one embodiment, the access URI is important in conveying information in identifying access network 301 to the NRE so that the proper routing decision can be made. The egress URI specified in table 410 also is useful in steering the call to egress network 306 to avoid egress network 305 per the agreement between the three network providers. Previously, using only the destination IP address for routing, the desirable egress route cannot be specified exactly by the VoIP network 310.

In FIG. 3, in a second embodiment of the present invention, endpoint 352 makes a call to endpoint 355. The incoming call setup message from endpoint 352 is received by BE 312 via access point 322. BE 312 then inserts the access point 322 related information as an access ID into the call setup message and forwards it to CCE 311 to be processed. Note that an access ID basically is an access URI. Then, CCE 311 interacts with NRE 316 to obtain a routing decision for the call. The access URI may contain information related to access link 382, such as the access link identification (ID), the access link type, and other pertaining parameters. The detailed definitions and formats of an access URI will be given in URI-02200 and URI-02202 below. Upon receiving the call setup message, NRE 316 uses tables 400 and 410 to determine the routing of the call. For instance, NRE 316 uses the access URI, such as information of the access link ID and type, the access BE IP address, and the called party phone number to obtain a route list, from table 400, that is to be used to determine the routing of the call.

For example, in row 402, by using IP address of BE 312, access link 382 information, and endpoint 355 phone number as a key, NRE 316 determines that route list R2 (e.g., a routing decision) is to be used to route the call. Then, NRE 316 uses the selected route list, R2 in this example, as a key to table 410 to lookup the egress routing information, such as the egress BE IP address, the egress ID, and the egress associated action. An egress ID is simply a set of one or more egress URIs. It is sometimes beneficial to specify more than one egress URI in a consolidated fashion in a single egress ID. The egress URI may contain information related to the egress link, such as the egress link identification (ID), the egress link type, and other pertaining parameters. The detailed definitions and formats of egress URI will be given in section URI-02204, URI-02206, URI-02208, and URI-02210 below. When a route list produces multiple egress routing choices, the egress associated action indicates the order or the percentage on how these choices are to be used.

For instance, route list R2 produces two route choices in row 413 and row 414. The egress associated action column indicates that the egress routing choices shall 50% of the time use row 413 and 50% of the time use row 414. In other words, 50% of the calls shall be routed using the egress route in row 413 and the remaining 50% of the calls shall be routed using the egress route in row 414. In row 413, route list R2 produces the IP address of BE 313 and an egress URI, or an egress ID, using egress point 333/link 373. In row 414, route list R2 produces the IP address of BE 314 and an egress URI, or and egress ID, using egress point 342/link 375. The call can then be completed via egress network 305 to endpoint 355.

In this example, due to cost issues, even though BE 313 can complete the call to endpoint 355 via egress network 306, egress network 306 is not used. Similarly, even though BE 314 can complete the call to endpoint 355 via egress network 306, egress network 306 is not used. The egress URI, or egress ID, specified in table 410 is useful in steering the call to egress network 305 to avoid egress network 306 to lower the costs to complete the call. Previously, using only the destination IP address for routing, the desirable egress route cannot be specified exactly by the VoIP network 310.

In FIG. 3, in a third embodiment of the present invention, endpoint 353 makes a call to endpoint 356. The incoming call setup message from endpoint 353 is received by BE 312 via access point 323. BE 312 then inserts the access point 323 related information such as an access ID into the call setup message and forwards it to CCE 311 to be processed. Note that an access ID basically is an access URI. Then, CCE 311 interacts with NRE 316 to obtain a routing decision for the call. The access URI may contain information related to access link 383, such as the access link identification (ID), the access link type, and other pertaining parameters. The detailed definitions and formats of an access URI will be given in URI-02200 and URI-02202 below. Upon receiving the call setup message, NRE 316 uses tables 400 and 410 to determine the routing of the call. For instance, NRE 316 uses the access URI, such as information of the access link ID and type, the access BE IP address, and the called party phone number to obtain a route list, from table 400, that is to be used to determine the routing of the call.

For example, in row 403, by using IP address of BE 312, access link 383 information, and endpoint 356 phone number as a key, NRE 316 determines that route list R3 (e.g., a routing decision) is to be used to route the call. Then, NRE 316 uses the selected route list, R3 in this example, as a key to table 410 to lookup the egress routing information, such as the egress BE IP address, the egress ID, and the egress associated action. The egress URI may contain information related to the egress link, such as the egress link identification (ID), the egress link type, and other pertaining parameters. The detailed definitions and formats of egress URI will be given in section URI-02204, URI-02206, URI-02208, and URI-02210 below. When a route list produces multiple egress routing choices, the egress associated action indicates the order or the percentage on how these choices are to be used. However, route list R3 produces one route choice in row 415. In row 415, route list R3 produces the IP address of BE 314 and an egress URI, or egress ID, using egress point 341/link 374. The call can then be completed via egress network 306 to endpoint 356.

In this example, the calling party has made pre-arranged agreement to specify routes within VoIP network 310, even though BE 313 can complete the call to endpoint 356 via egress network 306, BE 313 is not used. For instance, the customer may have specified to use egress network 306 but would like to avoid egress routes in certain geographic location, e.g. BE 313 is in a location that the customer has specified to avoid for example if the BE 313 to Endpoint 356 path is longer than the BE 314 to Endpoint 356 path, and does not meet the media path latency requirements. The egress URI specified in table 410 is again useful in steering the call through BE 314 to egress network 306 using a different geographical egress point to avoid BE 313 altogether. Previously, using only the destination IP address for routing, the desirable egress route cannot be specified exactly by the VoIP network 310.

Figure 5:
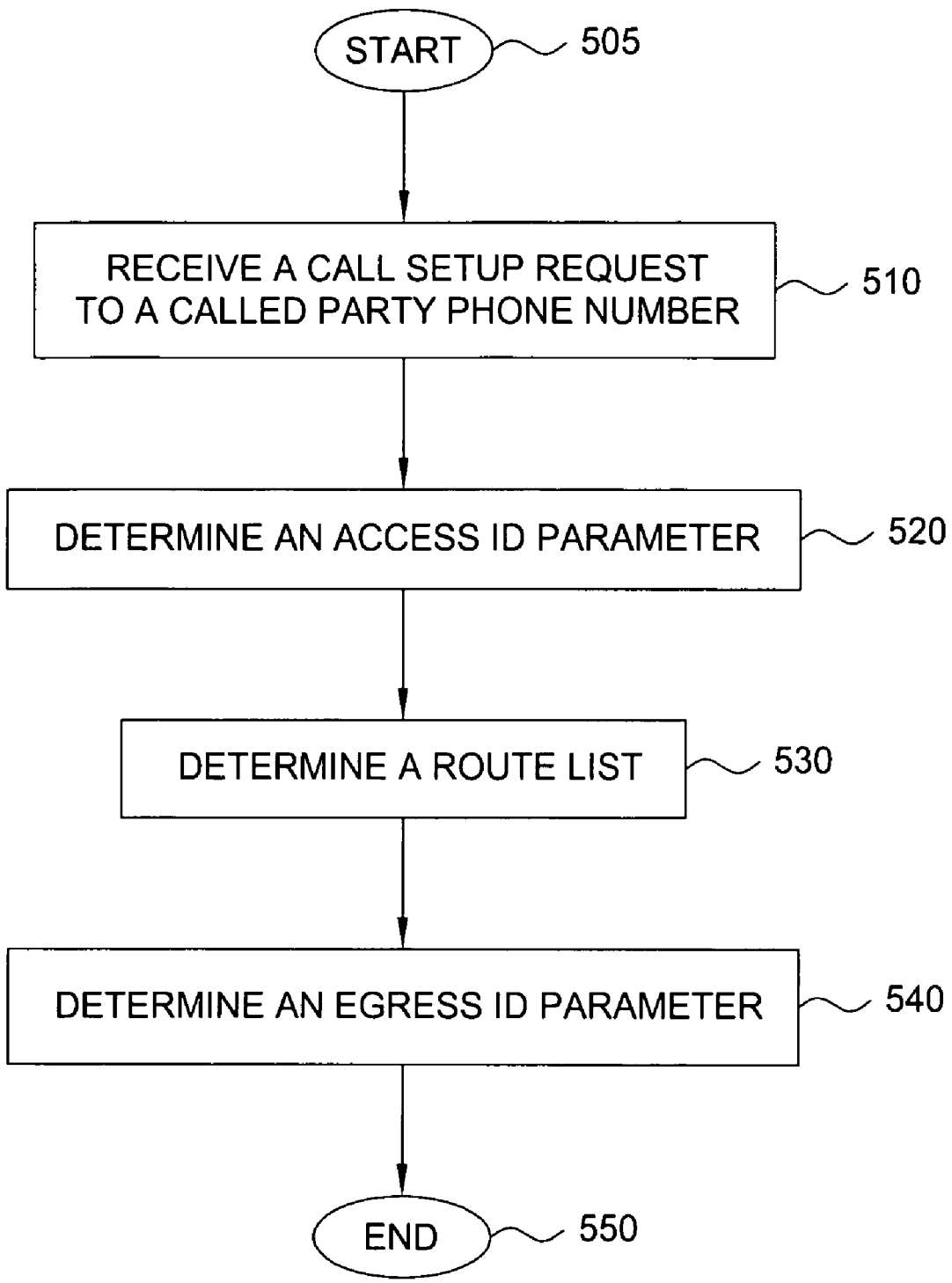
FIG. 5 illustrates a flowchart of a method for providing access and egress Identification parameters for routing.

FIG. 5 illustrates a flowchart of a method 500 for providing access and egress Identification parameters for routing in accordance with one embodiment of the present invention. Method 500 starts in step 505 and proceeds to step 510.

In step 510, method 500 receives a call setup message from a calling party, e.g., from endpoint devices 351-353 to a called party, e.g., to endpoint devices 354-356. For example, the call setup message can be received by BE 312.

In step 520, an access ID parameter is determined, e.g., an access URI is determined by BE 312. Once determined, the BE 312 will insert the access ID parameter and/or one or more criteria into a modified call setup message that is forwarded to the CCE and NRE for further handling.

In step 530, the access ID parameter and/or one or more criteria are used to determine a routing decision, e.g., a routing list. For example, the routing decision can be determined by the NRE.

In step 540, the routing decision is used to determine an egress ID parameter, e.g., one or more egress URIs. The one or more egress URIs may comprise one or more egress routes that can be used to setup the call. In one embodiment, the egress ID parameter is inserted into a modified call setup message that is then forwarded to an egress BE for handling. Method 500 ends in step 550.

The following is an example of a SIP INVITE with an access ID that is inserted by an access BE and sent to a CCE and a NRE:
  INVITE sip:+17324209999@24.25.30.60:5060; user=phone SIP/2.0
  Via:SIP/2.0/UDP
  172.16.21.102:5060;
    branch=z9hG4bK1ipr4e2010qhkbga81g0.1
  Contact: "Fred"<sip:+17323680000@172.16.21.102:5060;
    access=sip:1SNFCCA2147T.ngbe.voip.att.net;
    transport=udp; user=pho ne>
  From: "Fred"
  <sip:+17323680000@172.16.21.102:5060; user=phone>;
    tag=SD305s501-41e64d9c0001b968
  To: <sip:+17324209999@24.25.30.60:5060; user=phone>
  Call-ID: SD305s501-763d71ab3baa30e4375344566320ebdc-7c6qh32
  CSeq: 2 INVITE
  Content-Length: 185
  Content-Type: application/sdp
  Max-Forwards: 70
  . . . etc. . . . .

The access ID "access=sip:1SNFCCA2147T.ngbe.voip.att.net" is embedded in the example above. "1SNFCCA2147T" indicates that the access link is in the San Francisco, Calif., area, and connects to a TDM toll switch, and "ngbe" indicates that the access link is connected to an access BE that has TDM to VoIP conversion capability.

The following is an example of a SIP INVITE with both an access ID and an egress ID that is sent from the CCE to the egress BE:
  INVITE sip:+17324209999@24.25.30.60:5060;
    egress=sip:1001FRHDNJ0202T-1.type1.voip.att.net;
    user=phone SIP/2.0
  Via:SIP/2.0/UDP
  172.16.21.102:5060;
    branch=z9hG4bK1ipr4e2010qhkbga81g0.1
  Contact: "Fred"<sip:+17323680000@172.16.21.102:5060;
    access=sip:1SNFCCA2147T.ngbe.voip.att.net;
    transport=udp; user=pho ne>
  From: "Fred"
  <sip:+17323680000@172.16.21.102:5060; user=phone>;
    tag=SD3 05s501-41e64d9c0001b968
  To: <sip:+17324209999@24.25.30.60:5060; user=phone>
  Call-ID: SD305s501-763d71ab3baa30e4375344566320ebdc-7c6qh32
  CSeq: 2 INVITE
  Content-Length: 185
  Content-Type: application/sdp
  Max-Forwards: 70
  . . . etc. . . . .

The egress ID "egress=sip:1001FRHDNJ0202T-1.type1.voip.att.net" is embedded in the example above. "1001FRHDNJ0202T" indicates that the egress link is in the Freehold, N.J., area, and connects to a TDM toll switch, and "type1" indicates that the egress link is of type1 that qualifies a particular type of egress link.

The following definitions provide detailed Augmented Backus-Naur Form (ABNF) definitions and examples of access and egress URI formats. Detailed ABNF syntax specifications can also be found in the Internet Engineering Task Force (IETF) RFC 2234 document. Detailed ABNF syntax specifications related to SIP can also be found in the IETF RFC 3261 document. A BNF is a formal meta-syntax for describing content-free syntaxes. An ABNF is variation of BNF that has been used within IETF to define syntax format.

Note that in the following formal ABNF definitions, a leading ";" within a line indicates all texts after the ";" to the end of the line are comments.

Example egress ID parameters containing multiple egress IDs are given at the end of the definition of section URI-02208 and URI-02210. This format containing multiple URIs in a single consolidated egress ID reduces the need for crankbacks. Crankbacks occur when an egress route fails to complete a call and the call has to use an alternative egress route to try to complete the call. Therefore, if multiple egress URIs can be specified in a single egress ID, it reduces the occurrences of crankbacks. In this format, each egress ID can contain a userinfo/telephone subscriber portion as well as a host portion. The host portion specifies the next hop beyond the egress BE. The userinfo/telephone subscriber portion gives the delivered digits to the called endpoint. Inclusion of the delivered digits in the userinfo portion allows different delivered digits to be signaled for different egress routes.

The exemplary egress ID format may meet the following requirements:

- A SIP URI is used because the user portion of a SIP URI can be a telephone URI or it can be a name, such as bob@aol.com. By making the egress URI a SIP header parameter, it has more general applications than just telephone number URI.
- The same egress ID concept should be usable not just for SIP to TDM egress links but for SIP to SIP, SIP to H.323, SIP to MGCP, and other types of connectivity. URIs are very general and can be used for H.323 (h323:) instant messaging (im:), and email (mailto:) and other Services over IP (SoIP) in addition to VoIP and PSTN types of services.
- Multiple egress URIs and delivered digits can be supplied in a single SIP INVITE using a single egress ID parameter.

The following sections provide the formal definitions of various access URI and egress URI formats. These definitions are exemplary and should not be interpreted as a limitation to the present invention. The accessid parameter may be implemented as a uri parameter of the SIP From header URI, the SIP Contact header URI, or using some other SIP header URI.

<URI-02200-Start>

The ABNF for an access ID with TDM trunk group information shall conform to:
uri-parameter=transport-param/user-param/method-param/ ttl-param/maddr-param/lr-param/other-param
other-param=accessid/pname ['=' pvalue]
accessid="access=" accessURI
; The following cases of accessURI shall be supported:
;
; a1) for an network gateway BE or a SIP BE:
  accessURI="sip:" tgname "." tgdomain
  tgname=ALPHA/*(alphanum)  ALPHA*(alphanum/"-")
    alphanum/alphanum*(alphanum/"-") ALPHA*(alphanum)
  tgdomain=*(domain ".") toplabel # up to 24 characters
  toplabel=ALPHA/ALPHA*(alphanum/"-") alphanum
  domain=alphanum/alphanum*(alphanum/"-") alphanum
; a2) for an H.323 BE:
  accessURI="h323:" tgname "." tgdomain
  tgname=ALPHA/*(alphanum)  ALPHA*(alphanum/"-")
    alphanum/alphanum*(alphanum/"-") ALPHA*(alphanum)
  tgdomain=*(domain ".") toplabel # up to 24 characters
  toplabel=ALPHA/ALPHA*(alphanum/"-") alphanum
  domain=alphanum/alphanum*(alphanum/"-") alphanum
<URI-02200-End>

Note that tgname must have at least one ALPHA character; tgname must not have a period "." character; tgname can have an hyphen "-" character but not as the first or last character. Also, tgdomain must have at least one ALPHA character in the toplabel. The first character of the toplabel must be an ALPHA character. These restrictions allow the tgname.tgdomain format to be differentiated from the IP address format. The format of tgname.tgdomain conforms to the format for a hostname in a SIP URI per the RFC3261 ABNF. For example, tgname is the trunk group info (i.e. trunkgrp ID), and tgdomain is the trunk group type info (i.e. ngbe, 4E switch, IP PBX, ipbe, SIP GW, LD switch etc).

An example of a network gateway BE or a SIP BE access ID with TDM trunk group information is:
  access=sip:1SNFCCA2147T.ngbe.voip.att.net
  where the tgname is "1SNFCCA2147T", tgdomain is "ngbe.voip.att.net", toplabel is "net", and domain is "ngbe.voip.att".

An example of a H.323 BE access ID with TDM trunk group information is:
  access=h323:1SNFCCA2147T.ipbe.voip.att.net
  where the tgname is "1SNFCCA2147T", tgdomain is "ipbe.voip.att", toplabel is "net".

Some general access ID with TDM trunk group information examples are:
  access=sip:1001 FRHDNJ0202T-1.type1.voip.att.net
  access=sip:custsite2NY-00020.type2.voip.att.net
  access=h323:custsite2NY-00020.type3.voip.att.net
  <URI-02202-Start>

The ABNF for an access id with an IP address shall conform to:
uri-parameter=transport-param/user-param/method-param/ ttl-param/maddr-param/lr-param/other-param
other-param=accessid/pname ['=' pvalue]
accessid="access=" accessURI
; The following cases of accessURI shall be supported:
; b) for an H.323 BE only:
  accessURI="h323:" ipaddr
  ipaddr=IPv4address
; c) for a SIP BE only:
  egressURI="sip:" ipaddr
  ipaddr=IPv4address
<URI-02202-End>

An example of H.323 BE access ID with IP address is:
  access=h323:148.34.5.6
  where ipaddr is "148.34.5.6". This access ID format shall be used to indicate access from individual H.323 customer lines, without the overhead of TDM trunk group information. The IP address in the Access URI is the IP address of the SIP (or H.323) node which sent the SIP INVITE (or H.323 setup) to the BE. This is typically a piece of VoIP equipment, not a pure layer 3 router, for example the TA or Gateway/Router 132 in FIG. 1, or the IP Telephone or IP PBX 144 in FIG. 1.

An example of SIP BE access ID with IP address is:
  access=sip:148.34.5.6
  where ipaddr is "148.34.5.6". This access ID format shall be used to indicate access from an individual SIP phone, without the overhead of TDM trunk group information.

Some general access ID for IP address examples are:
  access=sip:135.16.78.76
  access=h323:135.16.78.76
  <URI-02204-Start>

The ABNF for a single URI egress ID parameter with TDM trunk group information shall conform to:

uri-parameter=transport-param/user-param/method-param/
  ttl-param/maddr-param/lr-param/other-param
other-param=egressid/pname ['=' pvalue]
egressid="egress=" egressURI
; The following cases of egressURI shall be supported:
; a1) for network gateway BE or SIP BE:
  egressURI="sip:" tgname "." tgdomain
  tgname=ALPHA/*(alphanum) ALPHA*(alphanum/"-")
    alphanum/alphanum*(alphanum/"-") ALPHA*(alpha-
    num)
  tgdomain=*(domain ".") toplabel # up to 24 characters
  toplabel=ALPHA/ALPHA*(alphanum/"-") alphanum
  domain=alphanum/alphanum*(alphanum/"-") alphanum
; a2) for an H.323 BE:
  egressURI="h323:" tgname "." tgdomain
  tgname=ALPHA/*(alphanum) ALPHA*(alphanum/"-")
    alphanum/alphanum*(alphanum/"-") ALPHA*(alpha-
    num)
  tgdomain=*(domain ".") toplabel # up to 24 characters
  toplabel=ALPHA/ALPHA*(alphanum/"-") alphanum
  domain=alphanum/alphanum*(alphanum/"-") alphanum <URI-02204-End>

Note that tgname must have at least one ALPHA character; tgname must not have a period "." character; tgname can have an hyphen "-" character but not as the first or last character. Also, tgdomain must have at least one ALPHA character in the toplabel. The first character of the toplabel must be an ALPHA character. These restrictions allow the tgname.tgdomain format to be differentiated from the IP address format. The format of tgname.tgdomain conforms to the format for a hostname in a SIP URI per the RFC3261 ABNF.

An example of network gateway BE or a SIP BE egress ID with TDM trunk group information is:
  egress=sip:1 SNFCCA2147T.ngbe.voip.att.net
  where the tgname is "1SNFCCA2147T", tgdomain is "ngbe.voip.att.net", and toplabel is "net".

An example of a H.323 BE egress ID with TDM trunk group information is:
  egress=h323:1 SNFCCA2147T.ipbe.voip.att.net
where the tgname is "1SNFCCA2147T", tgdomain is "ipbe.voip.att.net", and toplabel is "net".

Some general single-URI egress ID examples are:
  egress=sip:1001FRHDNJ0202T-1.type1.voip.att.net
  egress=sip:custsite2NY-00020.type2.voip.att.net
  egress=h323:custsite2NY-00020.type3.voip.att.net
  <URI-02206-Start>

The ABNF for a single-URI egressid parameter with an IP address shall conform to:
uri-parameter=transport-param/user-param/method-param/
  ttl-param/maddr-param/lr-param/other-param
other-param=egressid/pname ['=' pvalue]
egressid="egress=" egressURI
; The following cases of egressURI shall be supported:
; b) for an H.323 BE only:
  egressURI="h323:" ipaddr
  ipaddr=IPv4address
; c) for a SIP BE only:
  egressURI="sip:" ipaddr
  ipaddr=IPv4address <URI-02206-End>
An example of H.323 BE egress ID with IP address is:
  egress=h323:148.34.5.6
  where ipaddr is "148.34.5.6". This egress ID format shall be used to indicate egress route from individual H.323 customer lines, without the overhead of TDM trunk group information. The IP address in the Egress URI is the IP address of the SIP (or H.323 node) to which the BE will send the outgoing SIP INVITE (or H.323 setup). This is typically a piece of VoIP equipment, not a pure layer 3 router, for example the TA or Gateway/Router 133 in FIG. 1, or the IP Telephone or IP PBX 145 in FIG. 1.

An example of SIP BE egress ID with IP address is:
  egress=sip:148.34.5.6
  where ipaddr is "148.34.5.6". This egress ID format shall be used to indicate egress route from an individual SIP phone, without the overhead of TDM trunk group information.

Some general egress ID for IP address examples are:
  egress=sip:135.16.78.76
  egress=h323:135.16.78.76
  <URI-02208-Start>

The ABNF for a multiple egress URIs within a single egress ID parameter with trunk group information shall conform to:
uri-parameter=transport-param/user-param/method-param/
  ttl-param/maddr-param/lr-param/other-param
other-param=egressid/pname ['=' pvalue]
egressid="egress=" egressURI [*(& egressURI)]
; The following cases of egressURI shall be supported:
; Note: "%40" is the escape character code for "@".
; a1) for an NGBE, or SIP BE:
  egressURI="sip:" userinfo "%40" tgname "." tgdomain/
    "sip:" tgname "." tgdomain
  userinfo=user/telephone-subscriber; per RFC3261 &
    RFC3966 ABNF
  tgname=ALPHA/*(alphanum) ALPHA*(alphanum/"-")
    alphanum/alphanum*(alphanum/"-") ALPHA*(alpha-
    num)
  tgdomain=*(domain ".") toplabel # up to 24 characters
  toplabel=ALPHA/ALPHA*(alphanum/"-") alphanum
  domain=alphanum/alphanum*(alphanum/"-") alphanum
; a2) for an H.323 BE:
  egressURI="h323:" userinfo "%40" tgname "." tgdomain/
    "h323:"
  tgname "." tgdomain
  userinfo=user/telephone-subscriber; per RFC3261 &
    RFC3966 BNF
  tgname=ALPHA/*(alphanum) ALPHA*(alphanum/"-")
    alphanum/alphanum*(alphanum/"-") ALPHA*(alpha-
    num)
  tgdomain=*(domain ".") toplabel # up to 24 characters
  toplabel=ALPHA/ALPHA*(alphanum/"-") alphanum
  domain=alphanum/alphanum*(alphanum/"-") alphanum Note that tgname must have at least one ALPHA character; tgname must not have a period "." character; tgname can have an hyphen "-" character but not as the first or last character. Also, tgdomain must have at least one ALPHA character in the toplabel. The first character of the toplabel must be an ALPHA character. These restrictions allow the tgname.tgdomain format to be differentiated from the IP address format. The format of tgname.tgdomain conforms to the format for a hostname in a SIP URI per the RFC3261 ABNF.

An example of network gateway BE or a SIP BE egress ID with TDM trunk group information is:
  egress=sip:61234%401SNFCCA2147T.ngbe.voip.att.net
  where userinfo is "61234", tgname is "1SNFCCA2147T", tgdomain is "ngbe.voip.att.net", toplabel is "net".

An example of a H.323 BE egress ID with TDM trunk group information is:
  egress=h323:
    61234%401SNFCCA2147T.ipbe.voip.att.net where userinfo is "61234", tgname is "1SNFCCA2147T", tgdomain is "ipbe.voip.att.net", toplabel is "net".

Some general egress ID examples are given in paragraph [0077] below.

<URI-02208-End>
<URI-02210-Start>

The ABNF for a multiple egress URIs within a single egress ID parameter with IP address information shall conform to:
uri-parameter=transport-param/user-param/method-param/
　　ttl-param/maddr-param/lr-param/other-param
other-param=egressid/pname ['=' pvalue]
egressid="egress=" egressURI [*(& egressURI)]
; The following cases of egressURI shall be supported:
; Note: "%40" is the escape character code for "@".
; b) for an H.323 BE only:
　　egressURI="h323:" userinfo "%40" ipaddr/"h323:" ipaddr
　　userinfo=user/telephone-subscriber; per RFC3261 & RFC3966 ABNF
　　ipaddr=IPv4address
; c) for a SIP BE only:
　　egressURI="sip:" userinfo "%40" ipaddr/"sip:" ipaddr
　　userinfo=user/telephone-subscriber; per RFC3261 & RFC3966 ABNF
　　ipaddr=IPv4address
<URI-02210-End>

An example of H.323 BE egress ID with IP address is:
egress=h323:9999%40148.34.5.6 or egress=h323: 148.34.5.6
where userinfo is "9999" and ipaddr is "148.34.5.6". This egress ID format shall be used to indicate egress route from individual H.323 customer lines, without the overhead of TDM trunk group information.

An example of SIP BE egress ID with IP address is:
egress=sip:9999%40148.34.5.6 or egress=sip:148.34.5.6
where userinfo is "9999" and ipaddr is "148.34.5.6". This egress ID format shall be used to indicate egress route from an individual SIP phone, without the overhead of TDM trunk group information.

Figure 6:
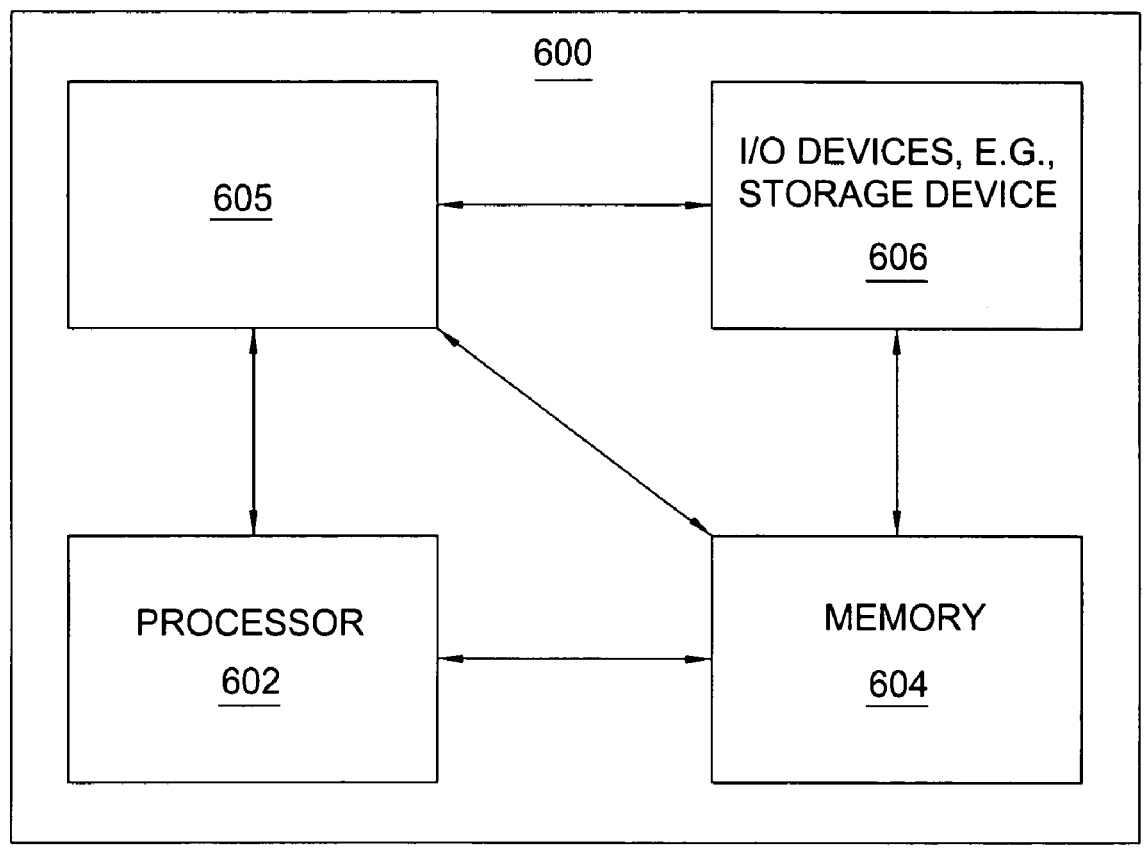
FIG. 6 illustrates a high level block diagram of a general purpose computer suitable for use in performing the functions described herein.

Some general egress ID with multiple egress URIs examples are:
egress=sip:1001FRHDNJ0202T-1.type1.voip.att.net&sip:2001FRHDNJ0202T-1.type1.voip.att.net
egress=sip:61234%401001FRHDNJ202T-1.type1.voip.att.net&sip:81234%402001FRHDNJ0202T-1.type1.voip.att.net
egress=sip:61234; cic=+10288%401001FRHDNJ0202T-1.type1.voip.att.net&sip:81234; cic=+10288%402001FRHDNJ0202T-1.type1.voip.att.net
egress=sip:custsite2NY-00020.type2.voip.att.net
egress=sip:135.16.78.76&sip:135.61.87.67
egress=sip:0000161234%40135.16.78.76&sip:0000261234%401 35.16.78.76
egress=sip:0000161234%40135.16.78.76&sip:0000181234%401 35.16.78.70
egress=h323:custsite2NY-00020.type3.voip.att.net
egress=h323:135.16.78.76&h323:135.61.87.67
egress=h323:0000161234%40135.16.78.76&h323:0000261234% 40135.16.78.76
egress=h323:0000161234%40135.16.78.76&h323:0000181234% 40135.16.78.70
egress=h323:0000161234%40135.16.78.76& sip:+16065551234%401001FRHDNJ0202T-1.type1.voip.att.net FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), an access and egress URI routing module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present access and egress URI routing module or process 605 can be loaded into memory 604 and executed by processor 602 to implement the functions as discussed above. As such, the present access and egress URI routing process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing a call in a communication network, comprising:

receiving a first call setup message;

identifying an access identification (ID) parameter associated with said first call setup message;

generating a second call set up message by incorporating said access identification (ID) parameter into said first call setup message;

determining a routing decision in accordance with said access identification (ID) parameter in said second call set up message;

applying said routing decision for identifying an egress identification (ID) parameter, wherein said egress identification (ID) parameter comprises one or more egress Uniform Resource Identifiers (URIs); and generating a third call setup message by incorporating said egress identification (ID) parameter into said second call setup message.

2. The method of claim 1, wherein said third call setup message is forwarded to an egress border element (BE).

3. The method of claim 1, wherein said egress ID parameter is inserted in a call setup message header of said third call set up message.

4. A computer-readable medium having stored thereon a plurality of instructions, the plurality of instructions including instructions which, when executed by a processor, cause the processor to perform steps of a method for routing a call in a communication network, comprising:

receiving a first call setup message;

identifying an access identification (ID) parameter associated with said first call setup message;

generating a second call set up message by incorporating said access identification (ID) parameter into said first call setup message; and determining a routing decision in accordance with said access identification (ID) parameter in said second call set up message;

applying said routing decision for identifying an egress identification (ID) parameter, wherein said egress identification (ID) parameter comprises one or more egress Uniform Resource Identifiers (URIs); and generating a third call setup message by incorporating said egress identification (ID) parameter into said second call setup message.

5. A system for routing a call in a communication network, comprising:

means for receiving a first call setup message;

means for identifying an access identification (ID) parameter associated with said first call setup message;

means for generating a second call set up message by incorporating said access identification (ID) parameter into said first call setup message;

means for determining a routing decision in accordance with said access identification (ID) parameter in said second call set up message;

means for applying said routing decision for identifying an egress identification (ID) parameter, wherein said egress identification (ID) parameter comprises one or more egress Uniform Resource Identifiers (URIs); and means for generating a third call setup message by incorporating said egress identification (ID) parameter into said second call setup message.

* * * * *